United States Patent Office 3,705,152
Patented Dec. 5, 1972

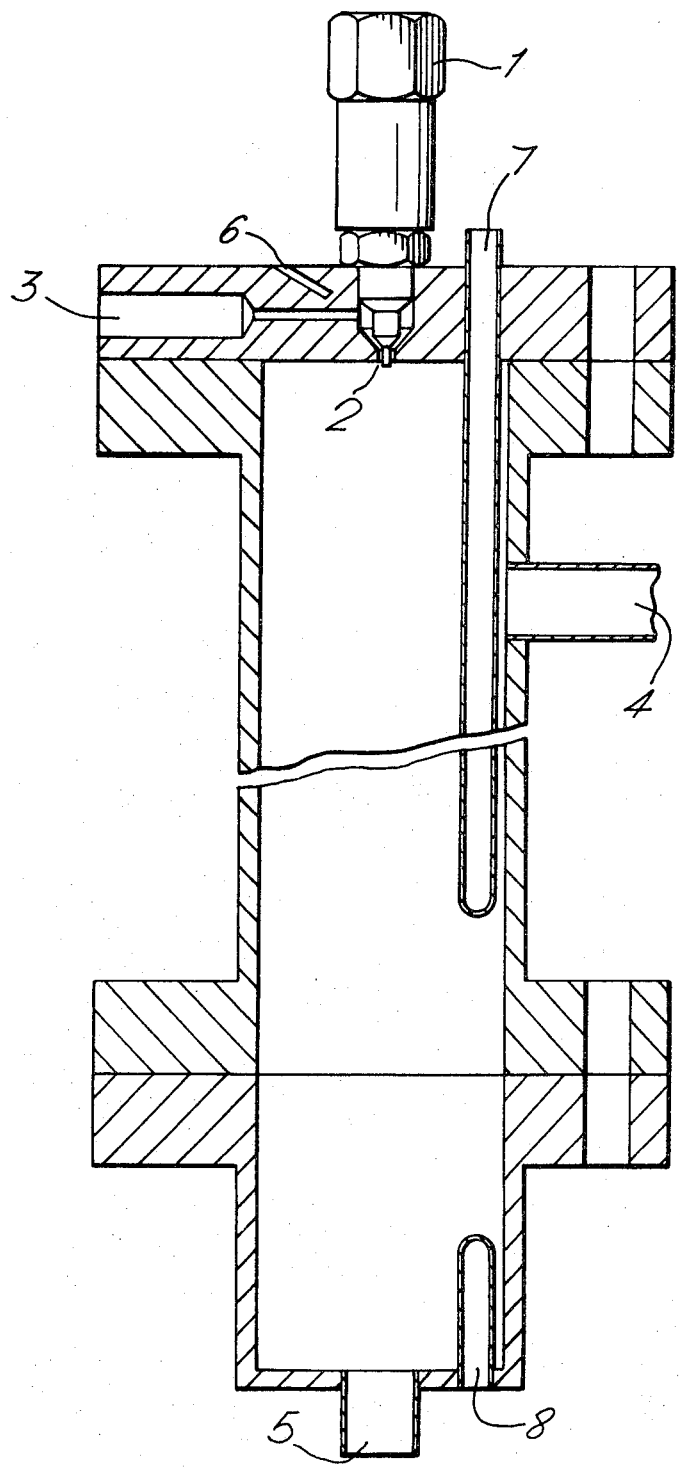

3,705,152
PRODUCTION OF NITROGEN-CONTAINING DERIVATIVES OF 1,12-DODECANEDIOIC ACID
Antony Harold Patrick Hall, New Malden, and Stuart Neil Dancer, Great Bookham, England, assignors to BP Chemicals Limited, London, England
Filed July 20, 1970, Ser. No. 56,487
Int. Cl. C07c 21/40; C07d 41/06, 41/00
U.S. Cl. 260—239.3 R
7 Claims

ABSTRACT OF THE DISCLOSURE

This invention relates to a process for producing derivatives of 1,12-dodecanedioic acid e.g. 11-cyanoundecanoic acid by spraying droplets of 1,1'-peroxydicyclohexylamine into a reactor containing an inert gas maintained at an elevated temperature and at a pressure of at least 300 mm. Hg.

---

The present invention relates to the production of nitrogen containing derivatives of alkane-$\alpha,\omega$-dioic acids having nitrogen bound to the $\omega$-carbon atom and, is an improvement in or modification of the process described in Belgian Pat. 702,603 which corresponds to U.S. Ser. No. 664,594, filed Aug. 11, 1967, which relates to a process for the production of derivatives of alkane-$\alpha,\omega$-dioic acids having nitrogen bound to the $\omega$-carbon atom which comprises heating a compound of formula

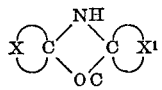

where X and $X^1$ and divalent aliphatic radicals which may be the same or different. In particular the preparation of 11-cyanoundecanoic acid and/or decane - 1,10-dicarbonimide by heating 1,1' - peroxydicyclohexylamine is described.

According to the present invention a process for the production of derivatives of 1,12-dodecanedioic acid having nitrogen bound to the 12 carbon atom comprises feeding 1,1'-peroxydicyclohexylamine in the form of liquid droplets into a gas, inert under the reaction conditions, maintained at an elevated temperature at a pressure in the range 300 mm. Hg to 3 atmospheres absolute.

1,1' - peroxydicyclohexylamine and processes for preparing it are described in Belgian Pat. 701,327 which corresponds to U.S. Ser. No. 651,969, filed July 10, 1967. 1,1'-peroxydicyclohexylamine is hereinafter referred to as peroxyamine.

The derivative of dodecane - 1,12 - dioic acid produced will depend upon the reaction conditions. Higher temperatures and longer residence times favour the formation of 11-cyanoundecanoic acid while lower temperatures and shorter residence times favour the formation of decane-1, 10-dicarbonimide.

The gas into which the liquid droplets are fed may be any gas which is inert under the reaction conditions. Examples of suitable gases are nitrogen, steam, and flue gas (obtained by combustion of fuel).

The peroxyamine may be obtained in the form of liquid droplets by any convenient method. These droplets may consist substantially only of the peroxyamine but may contain other materials. Thus the peroxyamine may be produced in the form of liquid droplets by spraying it in the liquid phase into the reactor.

For example the peroxyamine in the liquid phase may be converted into droplets by atomizing a stream of the peroxyamine in the liquid phase by the action of a stream of gas maintained at elevated temperatures. Atomization is obtained in the same way as a scent-spray and suitable atomizers will be known to those skilled in the art. Alternatively the liquid droplets may be produced by forcing the peroxyamine in the liquid phase through suitable spray-nozzles without the action of a gas stream being required to cause atomization. Other types of atomizer e.g. rotating cup atomizers may also be used.

The peroxyamine in the liquid phase which is converted to droplets may be in the molten form or may be in the form of a solution in a solvent. It is preferred to use solutions of peroxyamine in cyclohexanone and the peroxyamine is often obtained in the form of a solution in cyclohexanone in processes in which the peroxyamine is produced as is disclosed in British patent application 31380/66 cognate corresponding to Belgian Pat. 701,327 which corresponds to U.S. Ser. No. 651,969, filed July 10, 1967. These solutions may be fed to the process with or without further quantities of cyclohexanone.

The reaction is carried out at a pressure of 300 mm. Hg to 3 atmospheres (absolute). The pressure is preferably atmospheric pressure or a pressure close to atmospheric pressure e.g. 0.9 to 1.3 atmospheres.

The temperature at which the gas is maintained in the reactor may vary over a moderately wide range of temperatures. Thus temperatures in the range 250° C. to 1000° C. may be used. The lower temperature limit is preferably 300° C. while the upper limit is preferably 600° C. It is to be understood that these temperatures refer to the reaction zone and not to the temperatures of any gas stream before it enters the zone.

The residence time of the peroxyamine in the reactor may vary over a moderately wide range. Examples of suitable times are those in the range 0.05 second to 5 seconds.

With a residence time of approximately 0.5 second reaction temperatures of over 360° C. favour the formation of 11-cyanoundecanoic acid, and with a residence time of approximately 4 seconds 11-cyanoundecanoic acid is the major product at reaction temperatures of over 300° C.

The gas which is inert under the reaction conditions is preferably fed to the reaction zone at a rate such that the mole ratio of inert gas to the peroxyamine is in the range 5:1 to 500:1.

The reaction may be carried out in any convenient reaction system, but it is preferably carried out in an unpacked reactor, which is preferably substantially adiabatic i.e. a reactor in which no substantial quantity of heat is transmitted to the interior of the reactor by the walls of the reactor and which reactor has a low surface to volume ratio, e.g. less than 1 cm.$^{-1}$.

The use of pressures in the range 300 mm. Hg to 3 atmospheres and in particular the use of pressures close to atmospheric pressure enables construction of the reactor system to be simplified and the requirement for pumps etc. to be much reduced compared with operation at pressures of 0.1 to 300 mm. Hg.

The invention will now be described by reference to the following examples.

Where the examples given below are stated to be carried out in a 2 ft. x 3 in. reactor, the reactor used consisted of a 2 ft. long stainless steel tube having an outside diameter of 3 in. and an inside diameter of 2.75 in. The atomising jet was incorporated into the top flange of the reactor. Reaction products were removed at the bottom of the reactor to a condensation and collection system. A cross section of the reactor is shown in the accompanying drawing.

Two electric heating elements were wound round the outside of the reaction zone to compensate for heat losses through the walls. The 1,1'-peroxydicyclohexylamine was fed in at inlet 1 through a small filter to the atomising jet 2. Superheated steam fed by inlet 3 caused the peroxyamine to atomise and also carried it through the reaction zone. A side arm, 4, was provided through which additional steam could be supplied if necessary. The products were withdrawn through the outlet pipe 5. Pockets 6, 7 and 8 were provided for the insertion of thermocouples.

The 2 ft. x 2 in. reactor had an inside diameter of 1.75 in. and was also wound with two heating elements. In all other respects it was identical to the 3 inch reactor.

EXAMPLE 1

4000 g. of the crude reaction product obtained from the process disclosed in British patent application 31380/66 corresponding to Belgian Pat. 701,327 which corresponds to U.S. Ser. No. 651,969, filed July 10, 1967, containing 3560 g. of peroxyamine and 400 g. of cyclohexanone were fed, over 80 minutes, with 5000 l./hr. of superheated steam at about 450° C., through an atomising spray into a 2 ft. x 2 in. reactor maintained at 500° C. and atmospheric pressure. The reaction products were condensed and the two phases separated. The organic phase was shown, by gas chromatographic analysis, to contain 1804 g. of 11-cyanoundecanoic acid, 284 g. of caprolactam and 756 g. of cyclohexanone. The aqueous phase was shown to contain an additional 180 g. of caprolactam and 116 g. of cyclohexanone.

EXAMPLE 2

5000 g. of the crude peroxide, containing 4172 g. of peroxyamine and 600 g. of cyclohexanone, were fed, over 100 minutes, with 3300 l./hr. of superheated steam through an atomising spray into a 2 ft. x 2 in. reactor maintained at 500° C. and atmospheric pressure. The reaction products were condensed and the two phases separated. The organic phase was shown to contain 2286 g. or 11-cyanoundecanoic acid, 415 g. of caprolactam and 1023 g. of cyclohexanone. The aqueous phase was shown to contain an additional 160 g. of caprolactam and 99 g. of cyclohexanone.

EXAMPLE 3

200 g. of the crude peroxide, containing 144 g. of peroxyamine were fed, over 16 minutes, with 1860 l./hr. of steam into a 5 ft. x 2 in. reactor maintained at 300° C. and atmospheric pressure. The reaction products were condensed and filtered to yield 48 g. of dodecane-1,10-dicarbonimide. The filtrate was extracted with diethylether. The extracts were dried and the ether distilled off to leave 91.2 g. of residue which was shown to contain 17.5 g. of 11-cyanoundecanoic acid and 7.7 g. of dodecane-1,10-dicarbonimide.

EXAMPLE 4

1200 g. of the crude reaction product obtained from the process disclosed in Belgian Pat. 701,327 which corresponds to U.S. Ser. No. 651,969 containing 942 g. of peroxyamine and 152 g. of cyclohexanone were fed, over 24 min., together with 1860 l./hr. of superheated steam through an atomising spray into a 2 ft. x 2 in. reactor. An additional 4000 l./hr. of superheated steam were fed into the reactor through a side arm. The reaction temperature was 500° C. and the residence time 0.18 second. The reaction products were condensed and the organic and aqueous phases separated. The organic phase was shown, by gas chromatographic analysis, to contain 490 g. of 11-cyanoundecanoic acid, 70 g. of caprolactam, and 259 g. of cyclohexanone. The aqueous phase contained an additional 58 g. of caprolactam and 72 g. of cyclohexanone.

EXAMPLE 5

400 g. of crude peroxide in the form of an oil containing 312 g. of peroxyamine were fed, over 57 min., with 1860 l./hr. of superheated steam through an atomising spray into a 2 ft. x 2 in. reactor. An additional 6000 l./hr. of superheated steam were fed into the reactor through the side-arm. The reaction temperature was 500° C. and the residence time 0.14 second. The reaction products were condensed and the organic and aqueous phases separated. The organic phase was shown to contain 156 g. of 11-cyanoundecanoic acid.

EXAMPLE 6

200 g. of the crude peroxide containing 151 g. of peroxyamine were fed, over 4.5 minutes, with 1860 l./hr. of superheated steam through an atomising spray into a 2 ft. x 3 in. reactor. An additional 4000 l./hr. of superheated steam were fed into the reactor through the side-arm. The reaction temperature was 375° C. and the residence time 0.54 second. The condensed products were filtered to yield 14.4 g. of dodecane-1,10-dicarbonimide, and the organic and aqueous phases of the filtrate were separated. The organic phase was shown to contain 48.7 g. of 11-cyanoundecanoic acid and 22.3 g. of dodecane-1,10-dicarbonimide.

EXAMPLE 6

The same reaction conditions were used as those described in Example 4. A total of 21 kg. of crude peroxide, containing 16.9 kg. of peroxyamine, was fed over 7.25 hours. Only 8 g. of tar were found in the reactor after this pyrolysis.

We claim:

1. In a process for the production of at least one member selected from the group consisting of 11-cyanoundecanoic acid and decane-1,10-dicarbonimide through pyrolysis of 1,1' - peroxydicyclohexylamine the improvement comprising feeding 1,1'-peroxydicyclohexylamine into an unpacked substantially adiabatic reactor in the form of liquid droplets into a gas, inert under the reaction conditions, and maintained at a temperature in the range of 250° C. to 1000° C. and at a pressure of 300 mm. Hg to 3 atmospheres absolute.

2. A process according to claim 1 wherein the gas into which the liquid droplets of 1,1'-peroxydicyclohexylamine are fed is selected from the group consisting of nitrogen, steam or flue gases or mixtures thereof.

3. A process according to claim 1 wherein the liquid droplets of 1,1'-peroxydicyclohexylamine comprise molten 1,1'-peroxydicyclohexylamine.

4. A process according to claim 1 wherein the liquid droplets of 1,1'-peroxydicyclohexylamine fed into an inert gas comprise a solution of 1,1'-peroxydicyclohexylamine in a solvent.

5. A process according to claim 4 wherein the solvent is cyclohexanone.

6. A process according to claim 1 wherein the residence time of 1,1'-peroxydicyclohexylamine in the reactor is in the range 0.05–5 seconds.

7. A process according to claim 1 wherein the mole ratio of the inert gas to 1,1'-peroxydicyclohexylamine fed to the reaction zone is in the range 5:1 to 500:1.

References Cited

FOREIGN PATENTS 702,603    2/1968    Belgium    260—239.3 R

HENRY R. JILES, Primary Examiner

R. T. BOND, Assistant Examiner

U.S. Cl. X.R.

260—239.3 A, 404, 586 R